US008027763B2

(12) United States Patent
Webster et al.

(10) Patent No.: US 8,027,763 B2
(45) Date of Patent: Sep. 27, 2011

(54) OBD II READINESS MONITOR TOOL APPARATUS AND METHOD

(75) Inventors: Thomas Webster, Kalamazoo, MI (US); Daniel Sampson, Kalamazoo, MI (US); Richard Mattox, Portage, MI (US); Matthew Koran, Medina, OH (US); Robert Roberts, South Euclid, OH (US); Hamid Namaky, South Russell, OH (US)

(73) Assignee: SPX Corporation, Charlotte, NC (US)

( * ) Notice: Subject to any disclaimer, the term of this patent is extended or adjusted under 35 U.S.C. 154(b) by 728 days.

(21) Appl. No.: 11/522,346

(22) Filed: Sep. 18, 2006

(65) Prior Publication Data

US 2007/0073458 A1 Mar. 29, 2007

Related U.S. Application Data

(60) Provisional application No. 60/719,598, filed on Sep. 23, 2005.

(51) Int. Cl.
*G01M 17/00* (2006.01)

(52) U.S. Cl. ............................ 701/29; 701/35; 702/182

(58) Field of Classification Search ............. 701/29–35; 702/182–186

See application file for complete search history.

(56) References Cited

U.S. PATENT DOCUMENTS 4,638,428 A 1/1987 Gemma et al.
5,319,785 A 6/1994 Thaller
5,671,141 A 9/1997 Smith et al.
5,916,286 A 6/1999 Seashore et al.
6,032,088 A 2/2000 Feldmann et al.
6,356,823 B1 * 3/2002 Iannotti et al. .................. 701/35
6,526,340 B1 * 2/2003 Reul et al. ........................ 701/29
6,529,808 B1 3/2003 Diem
6,636,790 B1 10/2003 Lightner et al.
6,640,166 B2 10/2003 Liebl et al.
6,640,268 B1 10/2003 Kumar
6,687,584 B2 2/2004 Andreasen et al.
6,810,309 B2 10/2004 Sadler et al.
6,879,894 B1 4/2005 Lightner et al.
6,928,348 B1 8/2005 Lightner et al.
6,931,309 B2 8/2005 Phelan et al.
6,941,203 B2 9/2005 Chen
6,965,816 B2 11/2005 Walker
6,993,421 B2 1/2006 Pillar et al.
7,010,416 B2 3/2006 Lewis
7,012,512 B2 3/2006 St. Denis
7,089,096 B2 8/2006 Liebl et al.
7,089,127 B2 8/2006 Thibedeau et al.
7,103,460 B1 9/2006 Breed
7,184,866 B2 2/2007 Squires et al.
7,305,289 B2 12/2007 Gessner et al.

(Continued)

OTHER PUBLICATIONS

Owner's Manual for Equus Products, Inc.'s Innova® Digital OBDII Code Reader, 2001, whole document.

(Continued)

*Primary Examiner* — Mark Hellner
(74) *Attorney, Agent, or Firm* — Baker Hostetler LLP

(57) ABSTRACT

An OBDII device method and system includes an inexpensive, user friendly way to determine a vehicle's readiness for emissions testing and if repairs were successful. An audible and/or visual indicator is provided to alert the repair shop technician or driver that the vehicle has completed its drive cycle and may now be tested for compliance with state and federal emissions laws or indicate that the emissions related repairs were successful.

16 Claims, 5 Drawing Sheets

U.S. PATENT DOCUMENTS

| | | | | |
|---|---|---|---|---|
| D558,621 | S | 1/2008 | Rich et al. | |
| D560,129 | S | 1/2008 | Rich et al. | |
| D560,527 | S | 1/2008 | Rich et al. | |
| 7,320,312 | B2 | 1/2008 | Takahashi | |
| 7,328,093 | B1 | 2/2008 | Gessner et al. | |
| 7,529,643 | B2 | 5/2009 | Nyberg | |
| 7,577,503 | B2 | 8/2009 | Bertosa et al. | |
| 7,634,351 | B2 | 12/2009 | Diem | |
| 7,650,210 | B2 | 1/2010 | Breed | |
| 7,657,354 | B2 | 2/2010 | Breed et al. | |
| 7,672,756 | B2 | 3/2010 | Breed | |
| 2002/0004694 | A1 * | 1/2002 | McLeod et al. | 701/29 |
| 2002/0007237 | A1 | 1/2002 | Phung et al. | |
| 2002/0059075 | A1 | 5/2002 | Schick et al. | |
| 2002/0077781 | A1 | 6/2002 | Liebl et al. | |
| 2003/0130774 | A1 | 7/2003 | Tripathi et al. | |
| 2005/0043868 | A1 | 2/2005 | Mitcham | |
| 2005/0187677 | A1 | 8/2005 | Walker | |
| 2005/0192727 | A1 | 9/2005 | Shostak et al. | |
| 2005/0273218 | A1 | 12/2005 | Breed et al. | |
| 2006/0026017 | A1 | 2/2006 | Walker | |
| 2006/0095233 | A1 | 5/2006 | Carr et al. | |
| 2006/0206246 | A1 | 9/2006 | Walker | |
| 2006/0224283 | A1 | 10/2006 | Fussey et al. | |
| 2006/0247843 | A1 | 11/2006 | Lewis, Jr. | |
| 2007/0073459 | A1 | 3/2007 | Webster et al. | |

OTHER PUBLICATIONS

Equus Monitor Newsletter—The Test Equipment and Gauge Authority, Spring 2001, whole document.

Commonwealth of Massachusetts Registry of Motor Vehicles, "Mass99 Specifications," Version 1.7.3, Nov. 5, 2002, pp. 1-342.

* cited by examiner

OBD II READINESS MONITOR TOOL APPARATUS AND METHOD

CROSS-REFERENCE TO RELATED APPLICATIONS

This application claims priority to U.S. Provisional Patent Application No. 60/719,598 entitled, "OBD II READINESS MONITOR TOOL APPARATUS AND METHOD," filed Sep. 23, 2005, which is hereby incorporated by reference in its entirety.

FIELD OF THE INVENTION

The present invention relates generally to automotive vehicles. In particular, it relates to an On-Board Diagnostic II apparatus, method and system.

BACKGROUND OF THE INVENTION

Recently manufactured vehicles are equipped with a special system called On-Board Diagnostic II (OBD II). OBD II monitors all engine and drive train sensors and actuators for shorts, open circuits, lazy sensors and out-of-range values as well as values that do not logically fit with other power train data. Thus, OBD II keeps track of all of the components responsible for emissions and when one of them malfunctions, it signals the vehicle owner by illuminating a Maintenance Indicator Lamp (MIL), such as a check engine indicator. It also stores Diagnostic Trouble Codes (DTCs) designed to help a technician find and repair the emission related problem. OBD II also specifies the means for communicating diagnostic information to equipment used in diagnosing, repairing and testing the vehicle.

An illuminated MIL means that the OBD II system has detected a problem that may cause increased emissions. A blinking MIL indicates a severe engine misfire that can damage the catalytic converter. The MIL is reserved for emission control and monitored systems and may not be used for any other purpose. The "Check Engine," "Service Engine Soon" or other "engine symbol" message is typically used as an MIL indicator.

The Clean Air Act of 1990 requires inspection and maintenance (I/M) programs to incorporate OBD II testing as part of a vehicle's emissions inspection program. When fully implemented, 1996 and newer model year vehicles registered in a required emission test area must be tested annually. If DTCs are present, or the diagnostic monitor software has not adequately tested the vehicle's emission control systems, the vehicle fails the emissions test. Otherwise, the vehicle passes the emissions test.

In order for a vehicle to pass the OBD II emissions tests, the vehicle under test (VUT) must report that all pertinent (as defined by each state) diagnostic monitors have completed their tests of the vehicle system. Diagnostic monitors that have completed their tests are said to be in a "Ready" state. Diagnostic monitors that have not completed their tests are said to be in a "Not Ready" state. Checking the readiness state of the diagnostic monitors via OBD II was incorporated into emissions testing to prevent owners from attempting to pass vehicles not in compliance by simply clearing the vehicle's Diagnostic Trouble Codes and then quickly retesting the vehicle before the root problem was again detected by the vehicle's on board computer. Clearing the DTCs on a vehicle also sets all of the monitors to the "Not Ready" state. Until the vehicle has been driven under the proper conditions for all of the monitors to execute their tests, the vehicle will not be ready for an emissions test.

The readiness state of the diagnostic monitors of the OBD II system indicates that emission system components have been checked. If a particular monitor is set to "Ready," the monitor has checked its assigned components and systems. If a problem is found, a DTC is set, and a technician can retrieve the code. When all of the monitors supported on a vehicle are "Ready," the vehicle is ready for an emissions test.

Unlike DTCs, the readiness state of the diagnostic monitors cannot be manipulated via a scan tool, rather their status is altered by a Drive Cycle, which is a series of specific vehicle operating conditions that enable the diagnostic monitors to test the vehicle's emissions control hardware. As each monitor completes its testing, its readiness state will be set to "Ready." An example of a simple Drive Cycle is where the vehicle's engine is started, and the vehicle is driven for seven minutes. Then the vehicle is driven in stop-and-go traffic for six minutes including one minute of idling. After which, the vehicle is accelerated to forty-five miles per hour and maintained at that speed for one minute.

Repair shops and drivers may not be aware of when the vehicle is "Ready" to be tested for emissions, or when the required Drive Cycle has been completed in order to properly test the vehicle's emissions. Therefore, repair facilities need an inexpensive tool that enables either an untrained personnel (such as a driver) or a trained repair facility personnel, to determine the status of the OBD II readiness state of the diagnostic monitors while operating the vehicle through normal driving conditions. In addition, repair facilities need to encourage their client to return to their shop after the readiness monitors have been reset to the "Ready" position in order to verify the repair and/or complete the emissions testing.

Accordingly, the tool should simplify the process of determining the readiness state of the readiness monitors in a vehicle by indicating the status of all emission related diagnostic monitors of the vehicle. In addition, a tool is desired that alleviates the need to tie up a shop's expensive scan tool or skilled technician's time to determine the vehicle's readiness status for emissions testing. Accordingly, it is desirable to provide an apparatus and method that is an inexpensive and easy way of indicating a vehicle's readiness status for emissions testing.

SUMMARY OF THE INVENTION

The foregoing needs are met, to a great extent, by the present invention, wherein in one aspect an apparatus is provided that in some embodiments inexpensively and simply provides an indication that, based on the states of all of the pertinent diagnostic monitors, the vehicle either is or is not "Ready" for an emissions test.

In accordance with one embodiment of the present invention, an apparatus for determining emissions testing readiness of a motor vehicle includes a processor operably coupled to a vehicle diagnostic connector to determine a status of at least one readiness monitor, at least one vehicle communication protocol interface operatively coupled to the processor that can allow the processor to communicate with the vehicle, a multiplexer operably coupled to the processor, a computing device interface operably coupled to the multiplexer, a housing surrounding the processor and the at least one vehicle communication protocol interface, the multiplexer, and the computing device, wherein the housing has a port configured to couple to a computing device, and an indicator disposed on the housing, for indicating the readiness of the vehicle for emission testing.

In accordance with another embodiment of the present invention, a method of determining a readiness of a motor vehicle for emissions testing includes providing a tool for determining the readiness of the motor vehicle for emissions testing, determining if the tool is connected to a host, determining the readiness of the motor vehicle for emissions testing by monitoring the status of readiness monitors when the tool is not connected to the host, and alerting through an indicator that the motor vehicle is ready for emissions testing.

In accordance with yet another embodiment of the present invention, a system for determining the readiness of a motor vehicle for emissions testing includes means for processing in communication with means for coupling to a vehicle's computer, wherein the means for processing determines a status of at least one readiness monitor, means for communicating in at least one vehicle communication protocol, wherein the means for communicating is in communication with the means for processing, means for multiplexing operably couples to the means for processing, means for interfacing with a computing device operably coupled to the means for multiplexing, means for housing that surrounds the means for processing, the means for communicating, the means for multiplexing, and the means for interfacing, and means for indicating when the motor vehicle is ready for emissions testing.

In a further embodiment, an apparatus for determining emission repairs of a motor vehicle is provided and includes a processor that can be operably coupled to a vehicle diagnostic connector to determine a status of at least one readiness monitor, at least one vehicle communication protocol interface operatively coupled to the processor and can allow the processor to communicate with the vehicle, a multiplexer operably coupled to the processor, a computing device interface operably coupled to the multiplexer, a housing surrounding the processor, the at least one vehicle communication protocol interface, the multiplexer, and the computing device interface, wherein the housing has a port configured to couple to a computing device, and an indicator disposed on the housing that indicates whether emmissions related repairs were successful.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present invention includes a vehicle device that monitors the status of the I/M readiness monitors to determine if the vehicle is "Ready" for an emissions test. The device will indicate to a driver that the vehicle is ready for emissions testing by alerting the user via, for example, audio and/or visual signals or other alert indicators. Checking the readiness state of the diagnostic monitors allows a driver to save time by not having to return the vehicle for testing only to find out that the vehicle is still not ready for emissions testing.

Figure 1:
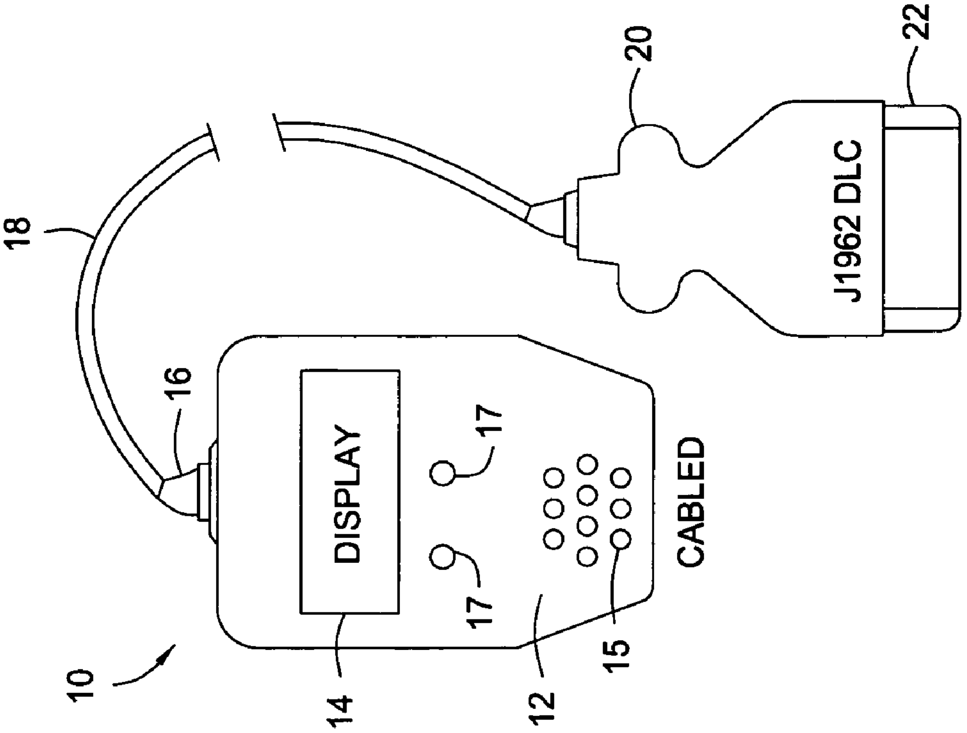
FIG. 1 is a plan view illustrating a cabled apparatus according to an embodiment of the invention.

The invention will now be described with reference to the drawing figures, in which like reference numerals refer to like parts throughout. FIG. 1 is a plan view illustrating a cabled device 10 according to an embodiment of the invention. The tool 10 includes generally, a housing 12 and a display 14. The housing 12 has an opening 16 for coupling a cable 18 to the housing 12. The display can be any type of display, such as an LCD, that provides any type of information, such as DTCs or that the vehicle is ready or not ready for emissions testing. The cable 18 couples the tool 10 to a connector 20 having an interface 22 that connects to a vehicle's onboard computer (not shown). The cable can be any length desired so that it allows the housing to be at any length away from the vehicle's computer as desired. In addition, a beeper 15 and an indicator 17 are disposed on the housing 12 to indicate when the vehicle is ready for emissions testing. The interface 22 can be any interface that interfaces with a vehicle, including a Data Link Connector (DLC), such as, for example, an SAE J1962 connector.

Figure 2:
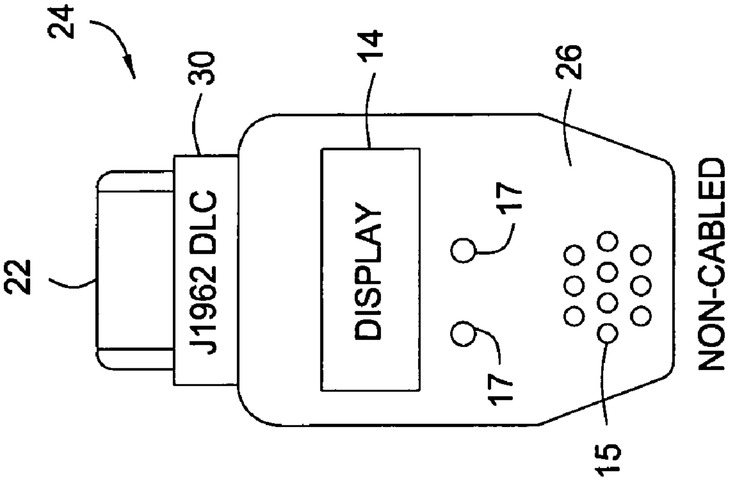
FIG. 2 is a plan view of a non-cabled apparatus according to another embodiment of the invention.

FIG. 2 is a plan view of a non-cabled tool 24 according to another embodiment of the invention. The non-cabled tool 24 has a housing 26 with a display 14. The housing 26 has an opening 30 for affixing the connector 22 that couples to a vehicle's onboard computer (not shown). Like tool 10, tool 24 also has the beeper 15, indicator 17, and the display 14 disposed on the housing 26. The non-cabled embodiment provides a compact device for a true one-piece device and compact storage. This embodiment can also be cheaper to produce due to decreased expense of not having a cable. Although both the beeper 15 and the indicator 17 are illustrated, only one or both may be used by the tool 10 or 24 and still be within the spirit of the present invention.

Internally, the tools 10 and 24 include a processor, memory, random access memory (RAM), communication circuitry and a power supply. The processor is configured with software enabling it to determine from the OBD II system whether the appropriate Drive Cycle has been completed and whether the monitors are set to "Ready" in order to perform the emissions test.

Figure 3:
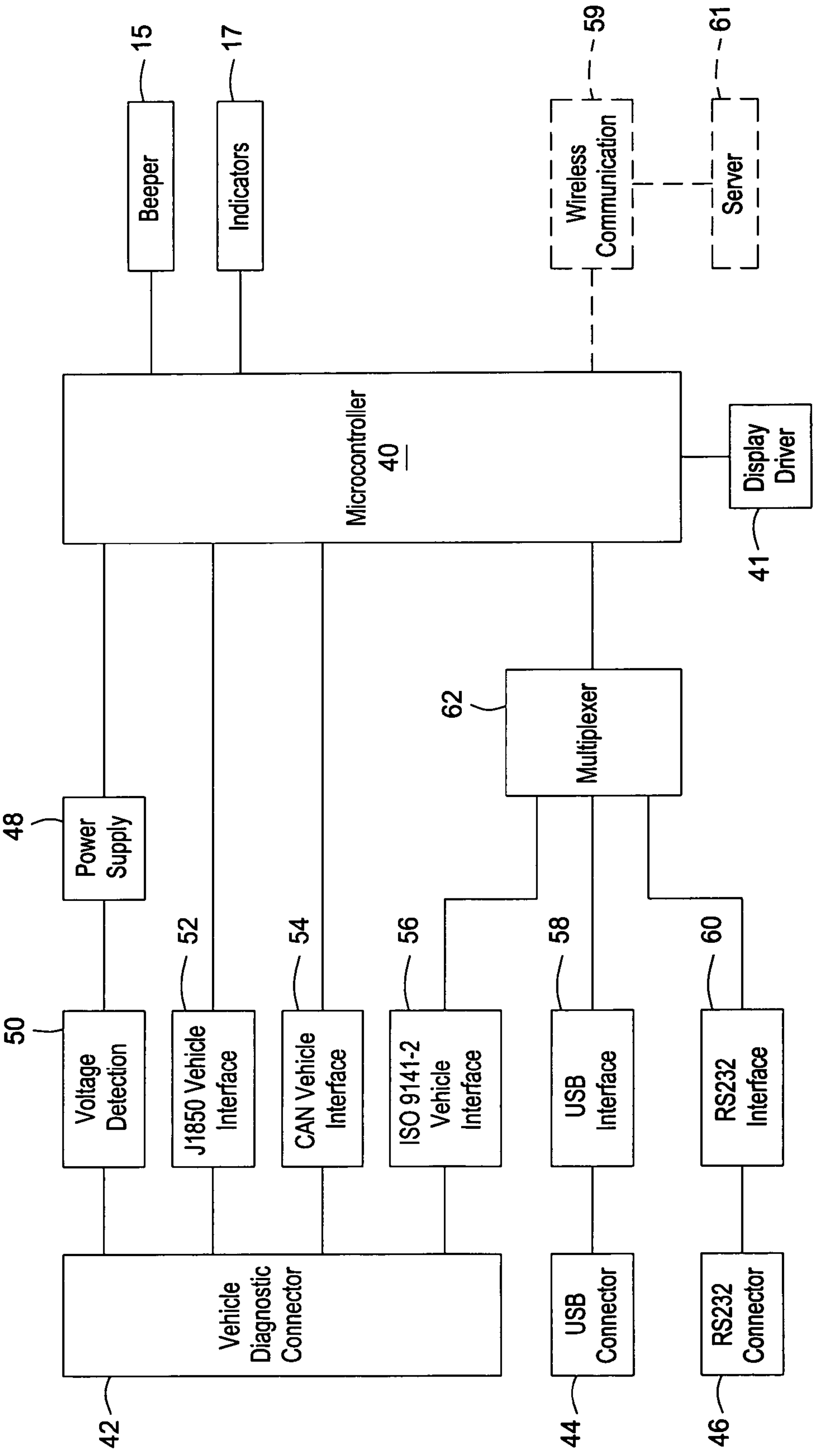
FIG. 3 is a schematic illustration of the tools of FIGS. 1 and 2.

FIG. 3 is a schematic illustration of the tools 10 and 24 of FIGS. 1 and 2. In particular, the tools 10 and 24 have a microcontroller or processor 40. The processor 40 is coupled to a vehicle diagnostic connector 42, a USB (Universal Serial Bus) connector 44, and an RS232 connector 46. In an alternative embodiment, the processor 40 can be a Field Programmable Gate Array (FPGA) or any other type of processor or controller.

The processor 40 is coupled to the vehicle diagnostic connector 42 through an SAE J1850 vehicle interface 52, a CAN (Controlled Area Network) vehicle interface 54 and an ISO 9141-2 vehicle interface 56. The processor is coupled to the ISO 9141-2 vehicle interface 56 by way of a multiplexer 62. The J1850 vehicle interface 52 includes the hardware and/or software that allow the processor 40 to communicate with a vehicle equipped with J1850 communication protocol. The CAN vehicle interface 54 includes the hardware and/or software that allow the processor to communicate with a vehicle equipped with CAN communication protocol. Additionally, the ISO 9141-2 vehicle interface includes the hardware and/or, software that allow the processor 40 to communicate with a vehicle equipped with ISO 9141-2 communication protocol. A person skilled in the art will recognize that other vehicle communication protocols may also be utilized and that their respective interfaces are well within the embodiments of this invention.

The processor 40 couples to the USB connector 44 using a USB interface 58 and couples to the RS232 connector 46 through an RS232 interface 60. The processor 40 couples to the USB interface 58 and the RS232 interface 60 via the multiplexer 62. The USB connector 44 allows the tool to communicate with another computing device, such as a computer, Personal Digital Assistant (PDA) or a scan tool, while the RS232 can be used to communicate with other communication equipment, including computing devices. The processor also couples with a display driver 41 to drive the display 14.

Further, a power supply 48 powers the processor 40 and the tool 10 or 24. The power supply 48 may be provided by the VUT or another power source, such as a battery (external or internal to the housing). The processor 40 is coupled to the power supply 48 through a voltage detection device 50. The voltage detection device 50 detects whether operating the full circuitry of the tool and/or charging the tool's internal battery, risks significantly discharging the vehicle's battery. When the vehicle's battery would be significantly drained by operating the full circuitry of the tool, the tool 10 or 24 is powered down and only the low-power voltage detection circuitry is operational. The processor 40 is also coupled to the beeper 15 and indicator 17 (discussed in greater detail below).

A device that uses power provided by the vehicle may drain the vehicle's battery unless the device is powered off when the vehicle engine is not running. In an embodiment of the present invention, tool 10 or 24 may be left coupled to the vehicle's computer even when the vehicle engine is not running without draining the vehicle's battery. The voltage detection device 50 may have a predetermined threshold of voltage for powering on, such as, for example 12.7 volts, the voltage of a fully charged battery. When the vehicle engine is started, the charging system may apply approximately 13.5 volts to the battery. This voltage keeps the battery fully charged and sometimes in an over charged state.

The voltage detection device 50 detects when the battery voltage is greater than 12.7 volts, the detection threshold, and the tool 10 or 24 powers on. It stays on while the vehicle engine is running and therefore, is powered by the vehicle charging system or the vehicle's battery. When the engine is turned off, the battery voltage will be approximately 13.5 volts. However, the voltage begins to decrease to the fully charged voltage of approximately 12.7 volts. While the battery's voltage decreases, the tool 10 or 24 is still powered on and receives power from the vehicle's battery. The time required for the decrease in voltage from 13.5 to 12.7 volts depends on various factors such as the strength of the battery, how long the vehicle was running, the battery temperature, etc. Time durations for this transition may be between approximately one to thirty minutes.

When the voltage reaches the detection threshold, the tool 10 or 24 powers off. Incidentally, the power drawn by the voltage detection device 50 may be negligible and does not discharge the vehicle battery. Thus, the tool 10 or 24 is powered on when the vehicle engine is (or has recently been) running and is powered off when the vehicle's engine is not (or has not recently been) running. However, in other embodiments of the invention, the tool 10 or 24 remains powered on for a certain amount of time after the vehicle powers off, so that the user can inspect the indicators 15 or 17 to ascertain whether the vehicle is "Ready."

In the event that the vehicle battery is weak and the time for the vehicle's battery to return to the fully charged state from the over charged state, is short, the tool 10 or 24 may be configured to remain powered on for a particular period of time beyond the time the vehicle powers off. For example, the tool 10 or 24 may remain powered on for approximately two minutes. This permits the operator to inspect the tool 10 or 24 even though the vehicle has powered off. Further, this time delay embodiment also does not significantly discharge the vehicle battery.

Thus, the tool 10 or 24 may also be plugged into the vehicle even when the vehicle's engine is not running without discharging the vehicle battery. The tool 10 or 24 is capable of turning on only when there is no risk of battery drain. When there is a risk of battery drain, the tool enters the stand-by mode where it requires very little or no power. When the tool 10 or 24 is operating, it draws its power from the vehicle's battery and/or charging system. Alternatively, the tool 10 or 24 may be powered by another source internal or external to the housing, such as the tool's own battery.

In a further embodiment of the present invention, the processor 40 may also be coupled to a wireless communication device 59 which may communicate with a server 61. In this manner, the processor 40 may communicate with a remote indicator that the vehicle is "Ready" for emissions testing. Thus, the server 61 may be used to send an email, text message or the like to any computing device, such as a PDA, PC, pager or cellular telephone indicating, for example, that the vehicle is ready for emissions testing. The server, which is a computing device, can itself indicate that the vehicle is ready for emissions testing via the methods described herein. The wireless communication device 59 and processor 40 may also communicate directly with another computing device, such as a PDA, PC, pager, or cellular telephone without first going through the server 41. Additionally, software updates, reprogramming, and functional aspects of the tool can be controlled via the wireless communication.

OBDII devices have the ability to communicate with the vehicle using one of the many different vehicle communication protocols that may exist in the vehicle's control system. Although, it should be transparent to the technician, not all devices communicate with all vehicles. Thus, a technician must own several different scan tools to perform engine performance diagnostics on a variety of vehicle makes. This can be an expensive endeavor. In this embodiment, all communication protocols can be utilized with the tool to communicate with the vehicle.

The tools 10 and 24 may be reprogrammed or configured by a technician using a computing device such as a personal computer, PDA or a scan tool with configuration software. For instance, if the technician wants to check the status of only a few of the 11 diagnostic monitors, the technician can configure the tool 10 or 24 to do so. New or additional information can be uploaded to the tool 10 or 24 in a similar fashion. The tool 10 or 24 simply needs to be connected to a computing device, such as a personal computer (PC), PDA or scan tool using a Universal Serial Bus (USB) interface 58, a RS232 serial interface 60, a wireless communication or an infrared connection. Any means of connecting the tool may be used including wireless and wired connections or other communication protocols are within the spirit of the invention.

Figure 4:
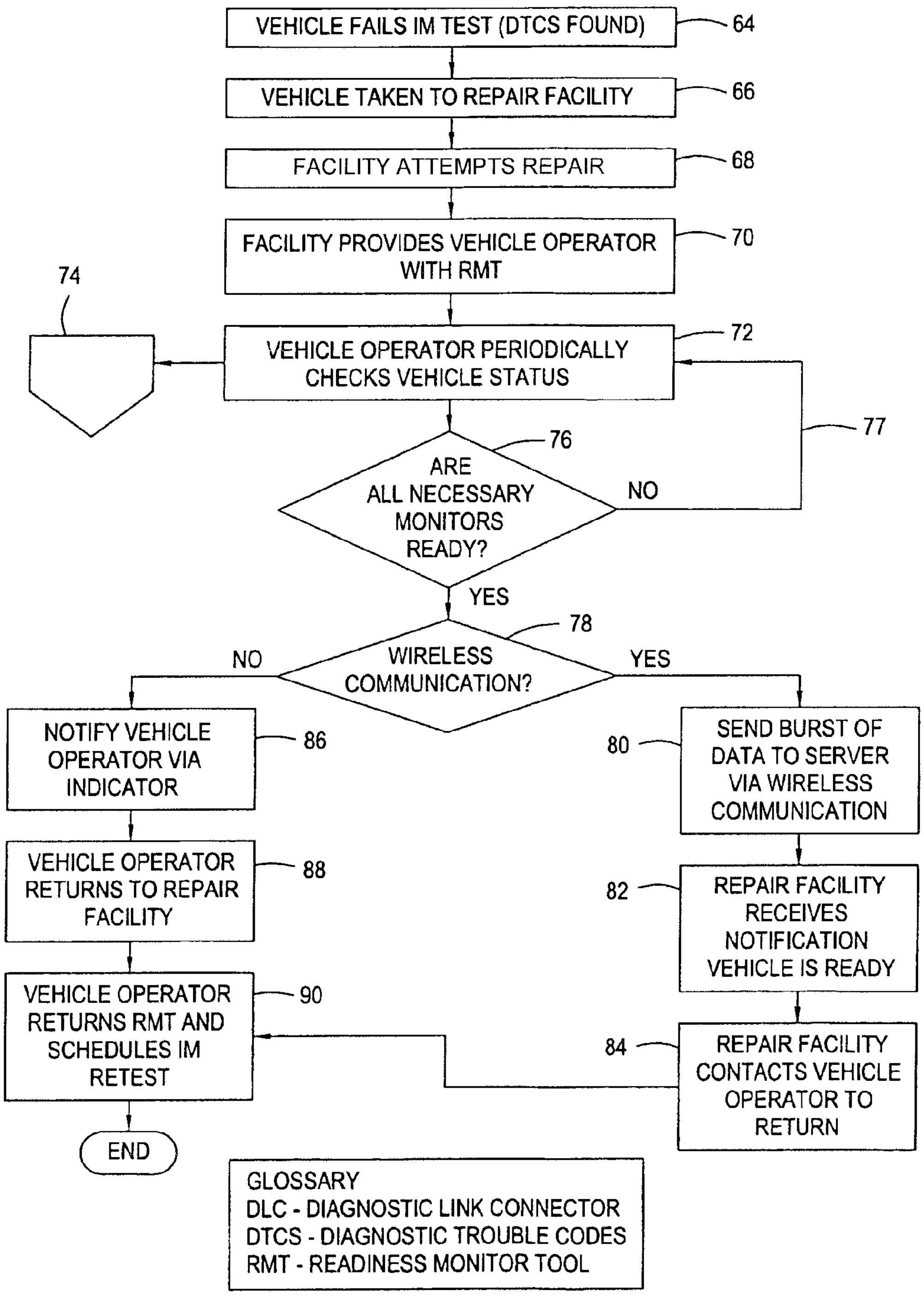
FIG. 4 is a flowchart illustrating steps in accordance with one embodiment of the method of the present invention.

FIG. 4 is a flowchart illustrating steps in accordance with one embodiment of the method of the present invention. The vehicle fails the I/M testing and DTCs are found at step 64. When the vehicle fails, the vehicle is taken to the repair facility at step 66 and the repair facility attempts to repair the vehicle at step 68. The DTCs are erased, which also set the readiness state of all of the diagnostic monitors to "Not Ready." The repair facility may be located at the same place as where the emission test is conducted. The facility then provides the vehicle operator with a readiness monitor tool 10 or 24 at step 70. The vehicle operator uses the tool 10 or 24 and periodically checks the "Ready" status at step 72 to determine if the vehicle has completed its Drive Cycle and whether the monitors are "Ready." If the necessary monitors are not ready, then proceed to step 77 and return to step 72 where the operator periodically checks until the monitors are ready. The tool can also periodically query the monitors at certain time intervals to determine if the monitors are "Ready."

If it is determined that all the necessary monitors are ready at step 76, the tool then determines it has wireless communication capabilities at step 78. If the tool has wireless communication capabilities, the tool sends a burst of data to the server 61 via the wireless communication device 59 at step 80. The repair facility then receives a notification, such as an email or other type of notification that the vehicle is ready for inspection at step 82. The repair facility then contacts the vehicle operator to return the vehicle and the tool at step 84. The operator then returns the tool and schedules an I/M retest at step 90.

After the tool determines whether all the necessary monitors are ready, if the tool does not include wireless communication at step 78, the tool then notifies the vehicle operator through an audio and/or visual indicator at step 86 via the beeper 15 or indicator 17 that the vehicle is ready for emissions testing. Upon being notified, the vehicle operator returns to the facility at step 88 and returns the tool and schedules an I/M retest at step 90 ending the process. Alternatively, the tool can provide wireless notification and notifies the operator through audio and/or visual indications on another device.

Figure 5:
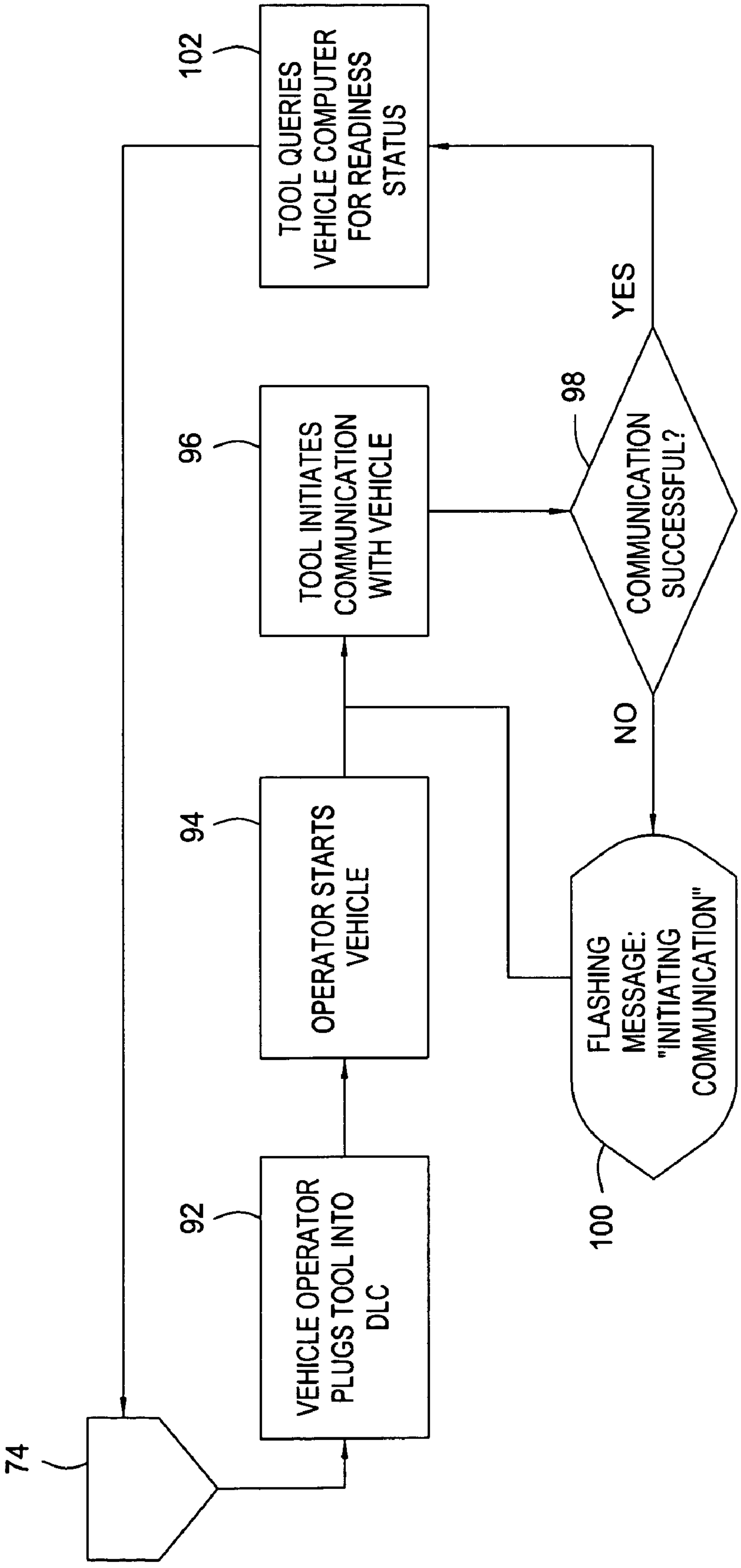
FIG. 5 is another flowchart illustrating steps in accordance with one embodiment of the method of the present invention.

FIG. 5 is another flowchart illustrating steps in accordance with one embodiment of the method of the present invention. During the period where the operator periodically checks the status at step 72, the vehicle operator plugs the tool into the diagnostic link connector at step 92 and starts the vehicle at step 94. The tool then initiates communication with the vehicle at step 96. If the tool has not initiated communication successfully at step 98 with the vehicle, the display indicates that the tool is still attempting to communicate with the vehicle at step 100 and returns to step 96. Once the communication is successful, the tool queries the vehicle's onboard computer to determine whether the vehicle is ready at step 102. If it is ready, then the tool 10 or 24 will proceed to step 76 via step 74.

Figure 6:
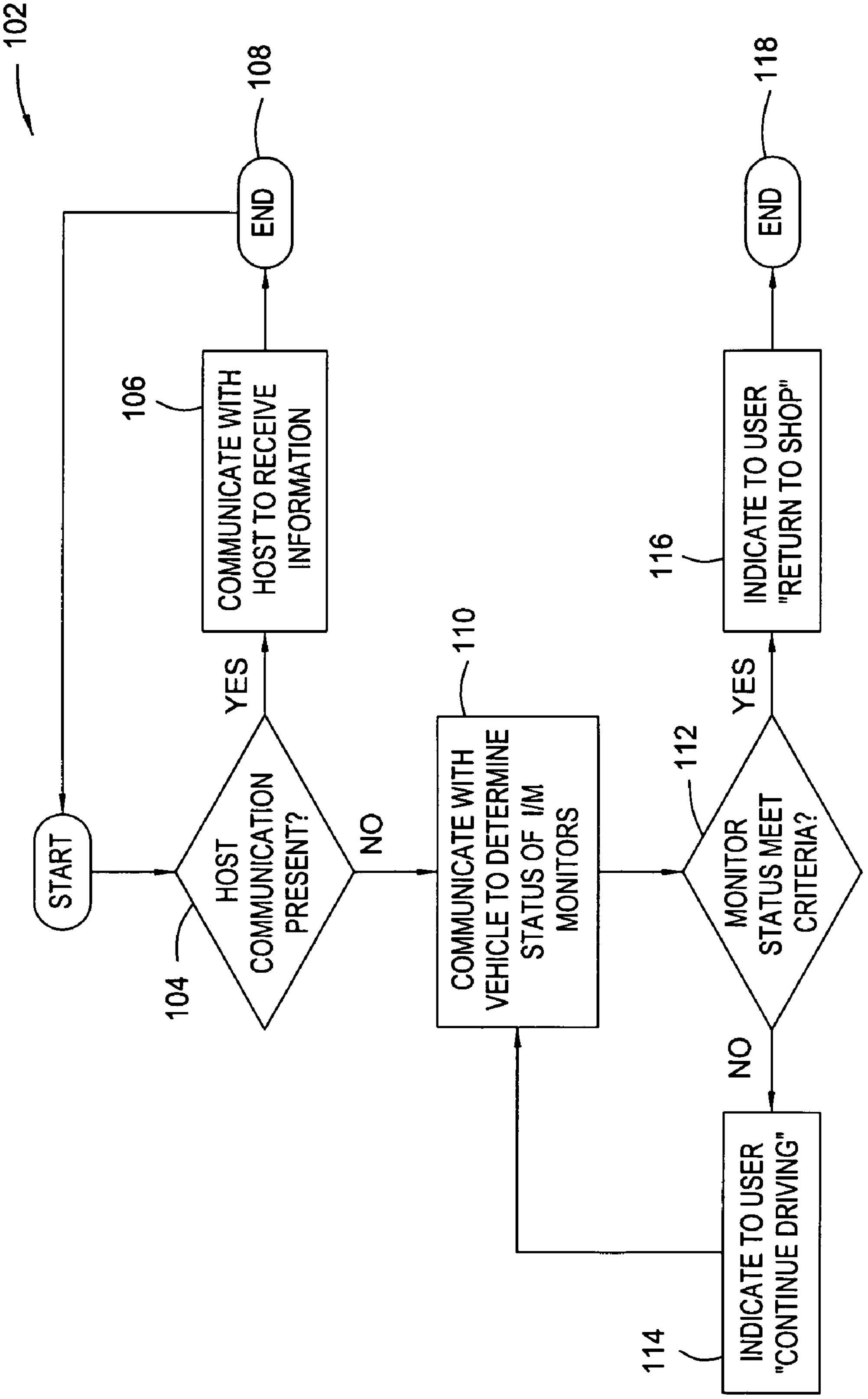
FIG. 6 is a flow chart illustrating the steps residing in the processor.

FIG. 6 is a flow chart illustrating the software program 102 residing in the processor 40. At step 104, when the tool is operational or on, the tool queries to see if a host computer is present. The host may be any computing device, such as, for example, a PC, a PDA or a scan tool that can be used to configure the tool. If host communication is present, the tool proceeds to communicate with the host to receive information, such as configuration data, updates or a new program at step 106. This may be new updates, for example, from an automobile manufacturer or software needed to communicate in a different communication protocol. Additionally, the tool can be configured to ignore certain readiness monitors that are always "off" due to certain conditions, such as environmental conditions that may never exist regardless of how many Drive Cycles are completed. Once the tool has been configured, the process ends at step 108. At this point, the user can power off the tool or unhook the tool from the host. The tool can then return to step 104.

However, if the tool determines that it is not communicating with the host, then it initiates communication with the vehicle's computer to determine the status of I/M monitors at step 110, then it proceeds to step 112 to determine whether the monitor status criteria has been met. If the criteria has not been met, the tool proceeds to step 114 where it indicates to the vehicle operator to "continue driving" on the display.

The "continue driving" indication may also be in the form of the beeper 15 or, for example, a light on the indicator 17, such as a red light. Also, this indication may be in the form of an in-action, in that there is no audible or visual indication through beeper 15 or indicator 17 in the event the criteria are not met and the vehicle operator has to continue driving. The tool then proceeds to 110 where it continues to communicate with the vehicle to determine the status of the I/M monitors and proceeds to step 112.

If the criteria has been met, the tool indicates to the vehicle operator that it is time to "return to the shop" at step 116. This indication may be had by way of, for example, an audible sound on the beeper 15 or a green light, or another type of visual indication on the indicator 17. Then the process ends at step 118. The "return to shop" signal may also be displayed alphanumerically on the display.

Although various configurations are possible, in an embodiment of the present invention, the beeper 15 may be a piezo-electric beeper having a variety of beeping mechanisms. The length and timing of beeps may be adjusted as desired. The indicator 17 may be a LED display or a plurality of LED displays. These LED indicators may flash on, turn off or held on continuously to indicate when the vehicle is "Ready" or "Not Ready."

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for determining emissions testing readiness of a motor vehicle, comprising:

a processor that can be operably coupled to a vehicle diagnostic connector to determine a status of at least one readiness monitor;

at least one vehicle communication protocol interface operatively coupled to the processor and allows the processor to communicate with the vehicle;

a multiplexer operably coupled to the processor;

a computing device interface operably coupled to the multiplexer;

a housing surrounding the processor, the at least one vehicle communication protocol interface, the multiplexer, and the computing device interface, wherein the housing has a port configured to couple to a computing device;

an indicator disposed on the housing for indicating the readiness of the vehicle for emission testing; and a voltage detection device configured to manage power to the apparatus, and having a power threshold for comparing with the power of a power source, wherein when the power of the power source exceeds the threshold, the voltage detection device allows the apparatus to be powered, and when the power of the power source is below the threshold, the voltage detection device restricts power to the apparatus.

2. The apparatus in claim 1, wherein the indicator is visual.

3. The apparatus in claim 1, wherein the indicator is audible.

4. The apparatus in claim 1, wherein the at least one communication interface is a J1850 vehicle interface, a CAN vehicle interface, or an ISO 9141-2 vehicle interface.

5. The apparatus in claim 1, wherein the computing device interface is at least one of the following: a universal serial bus interface, a RS232 interface and an infrared interface.

6. The apparatus in claim 1, wherein the connector comprises a cable for connecting to the vehicle's on board computer.

7. The apparatus in claim 1 further comprising a wireless communication interface for remote communication to a host regarding the status of the at least one readiness monitor.

8. The apparatus in claim 1, wherein the processor detects that the at least one readiness monitor is ready when the vehicle completes a drive cycle.

9. The apparatus in claim 1, wherein the computing device is a telephone, a personal computer, a personal digital assistant or a diagnostic scan tool.

10. The apparatus of claim 1 further comprising a display that provides information regarding the status to a user.

11. A system for determining a readiness of a motor vehicle for emissions testing, comprising:

means for processing in communication with means for coupling to a vehicle's computer, wherein the means for processing determines a status of at least one readiness monitor;

means for communicating in at least one vehicle communication protocol, wherein the means for communicating is in communication with the means for processing;

means for multiplexing operably coupled to the means for processing;

means for interfacing with a computing device operably coupled to the means for multiplexing;

means for housing that surrounds the means for processing, the means for communicating, the means for multiplexing, and the means for interfacing;

means for indicating when the motor vehicle is ready for emissions testing; and mean for detecting voltage that manages power to the system, and having a power threshold for comparing with the power of a power source, wherein when the power of the power source exceeds the threshold, the mean for detecting voltage allows the system to be powered, and when the power of the power source is below the threshold, the mean for detecting voltage restricts power to the system.

12. The system of claim 11, wherein the means of indicating is audible.

13. The system of claim 11, wherein the means of indicating is visual.

14. The system of claim 11, wherein the means for processing comprises a field programmable gate array (FPGA).

15. The system of claim 11, wherein the means of communicating can communicate in one of the following protocol J1850, CAN or ISO 9141-2.

16. The system of claim 11, wherein the means for indicating is a display screen that provides information regarding the status to a user.

* * * * *